United States Patent

Kazaoka et al.

[11] 3,860,260
[45] Jan. 14, 1975

[54] SAFETY BELT FOR VEHICLES

[75] Inventors: Kenichi Kazaoka, Nagoya; Kimiharu Hirose, Obu; Yasuo Takeshita, Toyota; Hisao Matsumoto, Toyohama, all of Japan

[73] Assignee: Aisin Seiki Kabushiki Kaisha, Kariya City, Japan

[22] Filed: Dec. 20, 1972

[21] Appl. No.: 316,719

[30] Foreign Application Priority Data
Dec. 24, 1971 Japan.................................. 47-1410
Dec. 24, 1971 Japan.................................. 47-1411

[52] U.S. Cl.......................... 280/150 SB, 180/82 C
[51] Int. Cl............................................. B60r 21/02
[58] Field of Search .............. 280/150 SB; 180/82 C

[56] References Cited
UNITED STATES PATENTS
3,680,883   8/1972   Keppel ......................... 280/150 SB Primary Examiner—Robert R. Song
Attorney, Agent, or Firm—Roditi, Schwartz & Nissen Waters

[57] ABSTRACT

Safety belt device for automotive vehicle comprising a shoulder belt and waist belt; said belts are both automatically displaced in response to ingress or egress motion of the passenger to their protecting or unprotecting position. The belts are linked together by a string member with a proper space therebetween so that the waist belt is enabled to remain at its proper position without being trailed upwardly by the shoulder belt beyond an acceptable maximum height if the vehicle should become very suddenly stopped, whereby the passenger may be safely prevented from being thrown forwardly out of the seat when the vehicle should become suddenly stopped.

6 Claims, 13 Drawing Figures

PATENTED JAN 14 1975

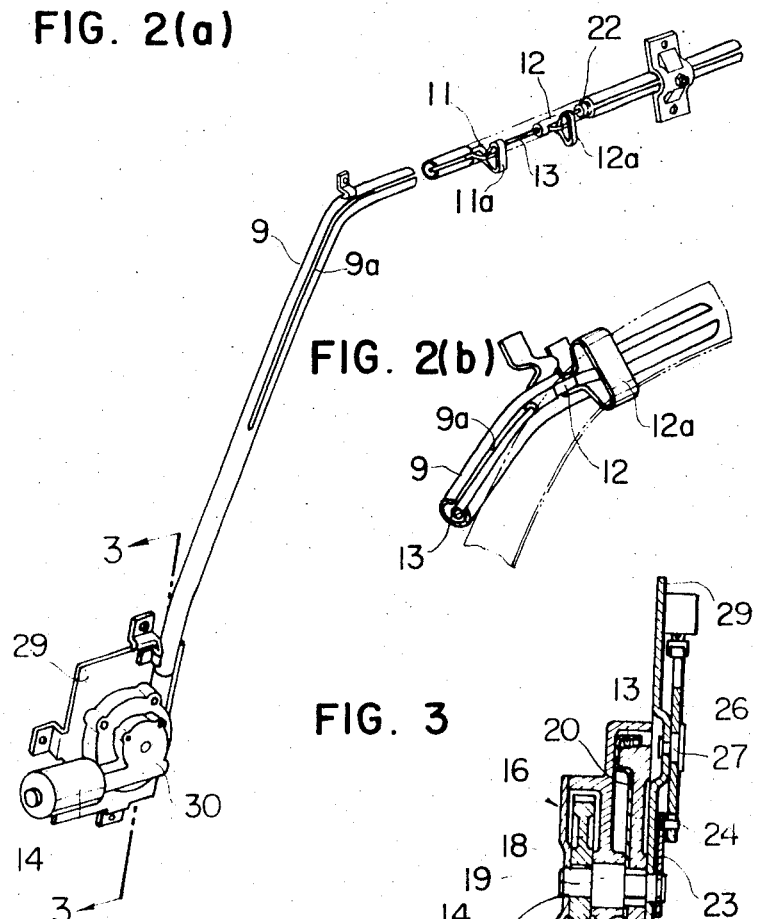
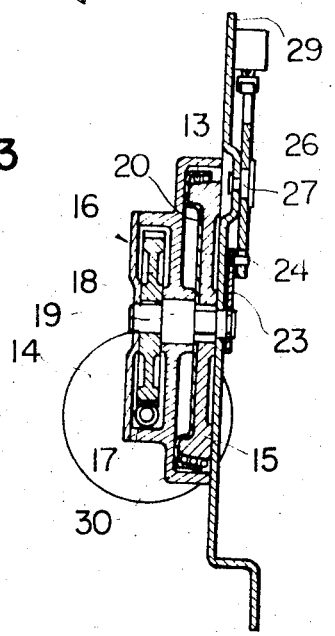

SAFETY BELT FOR VEHICLES

BACKGROUND OF THE INVENTION

This invention relates to safety devices for vehicles, and particularly to a safety device which is passed in front of the occupants of the vehicle on either seat to prevent such occupants from being thrown forwardly out of the seat if the vehicle should become very suddenly stopped, as by collision.

As used herein, the term "shoulder belt" refers to a seat belt having one end thereof permanently anchored on one side of the vehicle seat or the floor and the other end thereof permanently secured with respect to a portion of the roof side which is disposed on the other side of the vehicle seat wherein an intermediate portion of the seat belt is continuously disposed disgonally across the seated passenger's chest when the belt is in its protecting position.

As used herein, the term "waist belt" refers to a seat belt having one end thereof permanently anchored to a portion of the vehicle on one side of the seat or the floor and the other end thereof permanently secured with respect to a portion of the vehicle door which is disposed on the other side of the vehicle seat wherein an intermediate portion of the seat belt is continuously disposed across a portion of the vehicle seat in any opened or closed position of the vehicle door.

While various means have been previously employed for a safety belt apparatus having a pair of shoulder and waist belts for automatically securing a person to a vehicle seat upon his occupying same and turning on the vehicle's ignition, none have proven to be entirely sufficient, particularly in preventing the passenger from being passed through under the waist belt and thrown forwardly out of the seat if the vehicle should become very suddenly stopped.

SUMMARY OF THE INVENTION

A principal object of the invention is to provide an improved safety belt apparatus which automatically secures a person to a vehicle seat.

Another object of this invention is to provide safety belt apparatus having the shoulder belt and the waist belt with both the belts linked together at their middle portions in suitably spaced relation to each other in protecting position while in unprotecting position such space being permitted to vary as the belts move.

The foregoing object and others are attained according to at leat one aspect of the present invention through the provision of string means which links both the shoulder and waist belts together at their middle portions such that a preset space is ensured between said two belts in the protecting position while permitting said space to vary in the unprotecting position as the vehicle door is opened.

Thus in the disclosed embodiments, there is comprised a shoulder belt, one end of said belt being permanently anchored to a portion on one side of the vehicle seat or the floor and the other end thereof permanently secured with respect to a portion of the roof side which is disposed on the other side of the vehicle seat wherein an intermediate portion of the seat belt is continuously diagonally disposed across the seated passenger's chest when the belt is in its protecting position. Further, there is comprised a waist belt having one end thereof permanently anchored to a portion of the vehicle on one side of the seat or the floor and the other end thereof permanently secured with respect to a portion of the vehicle door which is disposed on the other side of the vehicle seat wherein an intermediate portion of the seat belt is continuously disposed across a portion of the vehicle door. Still further, there are comprised a string member linking both said shoulder and waist belts at their middle positions such that a preset space is ensured between said two belts in the protecting position while permitting said space to vary in the unprotecting position, a guide track extending closely along the curvature of the roof side from a portion near said end of said shoulder belt over the seated passenger's shoulder toward the lowermost end of the front pillar of the vehicle, sliding guide means to freely slide within said track and to engage said shoulder belt in freely slidable relation therewith, driving means, a cable connecting said driving means to said sliding guide means, and control means to control the said driving means in response to ingress or egress motion of the passenger whereby said shoulder belt is displaced to the operative protecting position or unprotecting position making it unnecessary for the occupant of the vehicle to consciously strap or release him in the vehicle in cooperatin with said waist belt.

BRIEF DESCRIPTION OF THE DRAWING

Additional object and the novel features of this invention will become apparent from the description which follows, taken in conjunction with the accompanying drawings, in which:

FIG. 2(a) is a perspective view of the guide track usable in the device addording to this invention in FIG. 1;

FIG. 2(b) is an enlarged scale perspective view of the guide track partially cut off;

FIG. 3 is an enlarged scale sectional view taken substantially on the line 3—3 of FIG. 2(a) and in the directin of the arrow;

DESCRIPTION OF THE PREFERRED EMBODIMENT

Figure 1:
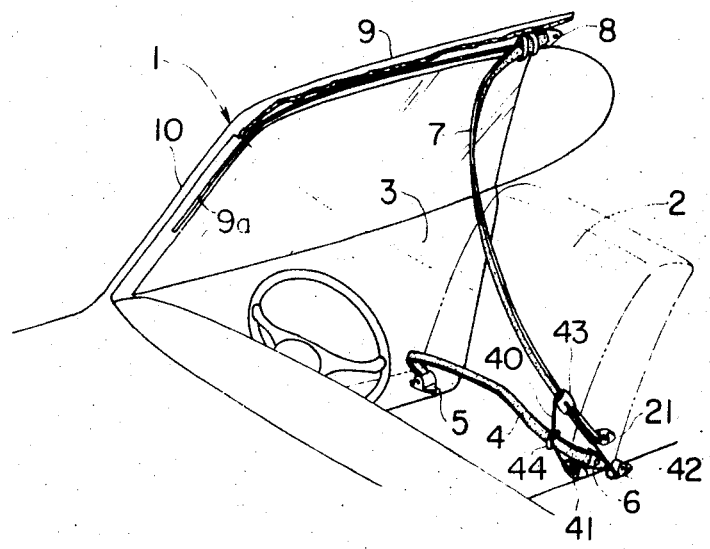
FIG. 1 is a fragmentary perspective sectional view of a part of a vehicle with the invention principles appled thereto.

Referring now to the drawings, in FIG. 1 is fragmentarily shown vehicle 1 with perspective view which will indicate that the prime but not exclusive field of utility for the invention is the automobile. In the view, is shown a portion of a vehicle seat 2 and a vehicle door 3 in a closed position and to which is mounted a belt retracting means 5 of known construction. The retracting means comprises a drum not shown and releasably securing means not shown. The drum is biased normally to rotate to wind thereupon the excess portion of the belt until the belt is snugly drawn about the passenger's body while permitting the belt to be unwound by pulling the belt against the spring to bias the drum. The releasably securing means is gripping engagement with the seat belt when the ignition is switched on and out of the engagement when the ignition is switched off whereby the passenger is strapped to the seat during the vehicle travel to prevent from being thrown forwardly out of the seat if the vehicle shoud become very suddenly stopped.

What has been described above is a retracting means of conventional structure, as commonly used in automotive vehicles and illustration therefore will not be necessary. For the purpose of explanation in detail of the operation of an apparatus to one embodiment of the invention, the accompanying drawings show appearance of the retracting means 5 only and not its specific structure, it being understood that the retracting means may itself be conventional.

The waist belt 4 is anchored at its one end to the retracting means 5 and at the other end to a portion of the vehicle on the side of seat 2 opposed to the door or the floor by means of conventional anchoring means 6. Shoulder belt 7 is permanently anchored to a portion of the vehicle on the seat side or the floor through the retracting means 21 and at the other end to a portion of the vehicle on the roof side immediately over the seated passenger's shoulder by means of the known anchoring means 8. The track or guide 9 extends axially along the roof side of the vehicle body between a portion on the roof side immediately over the passenger's shoulder and the lowermost end of the front pillar as best shown in FIG. 2. The track is of tubular form and is axially slitted throughout its full length. Two sliding guide members 11 and 12 are captive in the tubular track and free to slide therein. Rings 11a and 12a are respectively extending from the sliding guide members 11 and 12 as best shown in FIG. 2(b). The foot portion of each of rings 11a and 12a is passed slidably through the slit 9a of the track 9 so that rings are both on the exterior of the track 9. A cable 13 axially extends through the track 9 and is free to slide within the tubular track 9. The guide member 11 is fast on the cable 13 whereas the other guide member 12 is free to slide on the cable 13. The extremity end of the cable 13 is so enlarged that it provides stopper means 22 to prevent the member 12 from being fallen out of the cable when the cable is drawn toward the front pillar 10 as hereinafter described. It should be noted that although the cable is flexible, the stiffness thereof is so calculated in design that the cable may reciprocate within the track without flexure, while the diameter of the tubular track 9 being of suitable size to allow this reciprocation but prohibit the flexure. As shown in FIG. 3, motor 14 is mounted on the vehicle about the lowermost end of the front pillar 10 and through a reduction gearing assembly actuates a winding drum 15 on which there is the cable 13. This winding drum 15 is drivingly connected with the reduction gearing assembly. The motor and the reduction gearing assembly form a winding unit or driving means 16 to which is connected the track 9 so that the cable 13 may be reciprocated axially along the track as the motor drives the winding drum 15. Worm 17 and worm wheel 18 form the reduction gearing assembly the driven shaft 19 of which carries thereon the said winding drum 15 to wind the cable 13. A cover 20 provides means to prevent the cable 13 from tending to get out of the surface of the drum 15 upon its resiliency so that the cable is snugly wound upon the drum.

Figure 4:
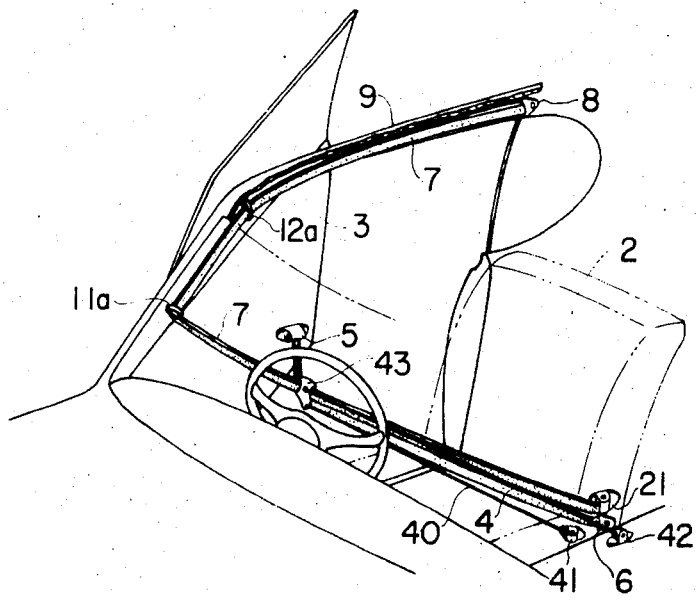
FIG. 4 is a view similar to that of FIG. 1 showing the door of the vehicle in opened position.

As the door is swung open, the cable is wound upon the drum as hereinbelow will be described so that the sliding guide member 11 is first moved toward the front terminal of the slit 9a. The second sliding guide member 12 is left for a little while until the stopper means 22 abuts to the guide member 12. After the abutment of the stopper means 22, the member 12 advances together with the stopper 22 toward the front pillar 10, namely the member 11 ahead advancing and the second member 12 following at a presetable distance from the first member 11. This relationship between the both guide members is best shown in FIG. 4. Reverse takes place when the cable is unwound from the drum. This is effective to position the belt 7 very closely along the roof side curvature of the vehicle body to thereby present no objection to the passenger to get out of or enter into the vehicle. When the first member 11 reaches the front unprotecting position, the belt 7 is so displaced that the upper major portion thereof lies along the roof side while remainder of the belt diagonally lies across the space in front of the seat 2. The passenger may accordingly get off or enter the vehicle as he would in the absence of such belt.

Figure 5:
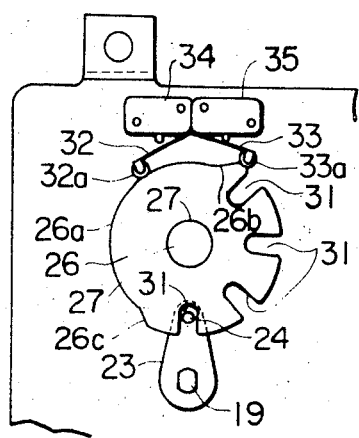
FIG. 5 and FIG. 6 are diagrammatical views of control means of the present invention to drive the drum in response to ingress or egress motion of the passenger.
Figure 7:
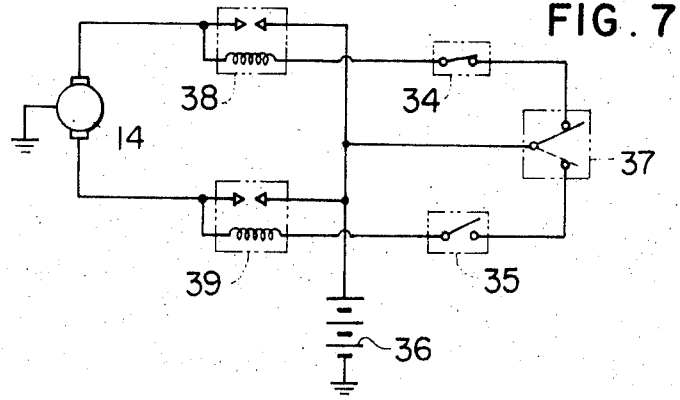
FIG. 7 is a schematic diagram indicating wiring for motors which actuates the winding drum in dependency upon the ingress or egress motion of the passenger.

The motor 14 operates so as to have the drum 15 wind up thereon or unwind therefrom the cable 13. Means to actuate the motor 14 is described hereinafter. As shown in FIG. 3, shaft 19 of the worm wheel 18 has thereon secured an arm 23 on which is fast a stud 24 as shown in FIG. 5. A cam or gear 26 is rotatably supported on a stud 27 fast on a base plate 29 of the vehicle body which is integral with a cover 30 of the reduction gearing assembly 16. As best shown in FIG. 5, the stud 24 engages radial slots 31 in the gear 26 while passing through the inner half of its circle of travel. The driven gear 26 is locked against rotation when the driving tooth or stud 24 is not in mesh by two resiliently engaging arms 32 and 33 extending downwardly from the switches 34 and 35 respectively. The arms 32 and 33 have rollers 32a and 33a at their extremity ends respectively for smooth engagement with a series of cam faces 26a, 26b and 26c formed on the periphery of the gear 26. The cam faces 26b and 26c have identical rise. Between the cam faces 26b and 26c is provided a series of radial slots 31. The cam face 26a is the falling side and the cam faces 26b and 26c are both the same rising sides of the cam 26. The driven cam 26 rotates through a fractional part of a revolution once each revolution of the driver arm 23, high ratio reduction gearing thus resulting. The motor 14 for sliding members 11 and 12 in the guide track 9 is connected with a suitable source of electrical energy 36, as shown in FIG. 7. Switches are provided to automatically control the actuation of the motor 14, there being one switch 37 in the path of travel of the door 3 at the door sill not shown. Such position is not exclusive field of utility for the switch and the switch may be operatively connected to the ignition switch. The limit switches 34 and 35 are both mounted in the path of the cam faces of the cam 26 as will be seen in FIG. 5. The switch 37 is arranged such that when the vehicle door 3 is opened and the sliding members 11 and 12 are in latched position (FIG. 1), the switch 37 is closed as shown in the view in heavy line. When the door is closed switch 37 is in the dotted line position as shown in FIG. 7. The switch 37, limit switches 34 and 35, electrical relays 38 and 39, motor 14 and electrical energy source 36 form wiring for motors causing motor 14 to be actuated.

Figure 6:
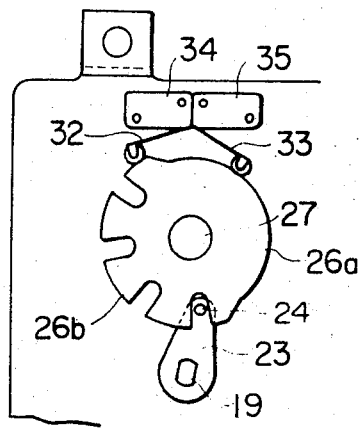

The operation of the invention is as follows: When the door is, say door 3, is opened, the passenger is allowed to get out of the vehicle without having even touch the safety belt. It should be noted that the gear 26 is in the position shown in FIG. 5 immediately before opening the door and the limit switch 34 therefore is closed whereas the other switch 35 is opened as shown in FIG. 7. Since the switch 37 has moved in the heavy line position in FIG. 7, it should be noted that the relay 38 becomes operative and thence motor 14 is caused to be actuated. The cable 13 is wound upon the winding drum 15 as previously described. The sliding guide member 11 and the stopper 22 together travel in spaced relation relative to each other as the motor 14 operates. Although the other sliding member 12 is left until it abuts the stopper member 22, it follow thereafter the sliding member 11 with the distance defined by the stopper 22 and the preceding member 11. The safety belt 7, freely slidable through the two rings 11a and 12a, is accordingly forced to shift toward the front pillar 10 to its unlatched position with its upper major portion closely along the roof side of the vehicle body, and the other portion diagonally across the space in front of the seat 2. At the time the belt is positioned as above described, the other waist belt 4 is also shifted diagonally across the space. Since cooperation of the two belts is an essential part of function of the invention, it will further be explained separately hereinafter. The occupant of the vehicle can ingress or egress from the vehicle without having to even touch the both belts. During the above operation, the both belts are together allowed to be drawn from the corresponding retracting members 5 and 21 as they are displaced and thereby tensioned. It will be noted that when the gear 26 is rotated through an angle in clockwise direction from the position shown in FIG. 5, the limit switch 35 is also closed as will be seen in FIG. 7. The motor continues to operate until sufficient cable length is wound around drum 15 and until the other cam face 26c opens switch 34. Then the motor 14 is stopped. This leaves switch 34 opened and switch 37 is in the dotted line position as shown in FIG. 7. The individual parts of the device are brought into the position shown in FIG. 6. When a person becomes seated in the vehicle, he closes the door 3 as he normally would in the absence of any safety device. The switch 37 is in the position indicated in dotted line in FIG. 7 and while the switch 35 has closed and the other switch 34 has been opened. The motor therefore rotates in adverse direction so that the cable is returned through the track until the switch 35 engages the cam face 26b as shown in FIG. 5 again. In case where either ingress or egress of the passenger is suspended and the safety belts are both to be returned to their preceding position, reverse takes place upon returning the door to its precedingly occupied position.

As will be seen in the embodiment of FIG. 1, the invention is characterized in that the cord or string member 40 is provided to link the both belts 7 and 4. The string member is permanently secured at its one end to the floor by means of a retractor 42 and at the other end to the seat side by means of another retracter 41.

Further, the string member 40 slidably passes through a small hole of the member 43 fast on the belt 7 and slidably passes through the ring 44 slidable on the seat belt 4.

From the foregoing, it will be understood that the string member 40 defines the space between the two belts in their protecting positions while in their unprotecting positions permitting the space to vary as the two belts move to occupy other positions.

Since the string member 40 serves to ensure a proper presetable space between the two belts in operation, the waist belt may remain at its proper position without being upwardly trailed by the shoulder belt 7 beyond an acceptable maximum height of the waist belt if the vehicle suddenly should become stopped, as by collision. This is very effective to prevent the passenger from being thrown forwardly through and under the waist belt in case of such sudden stop of the vehicle.

Figure 8:
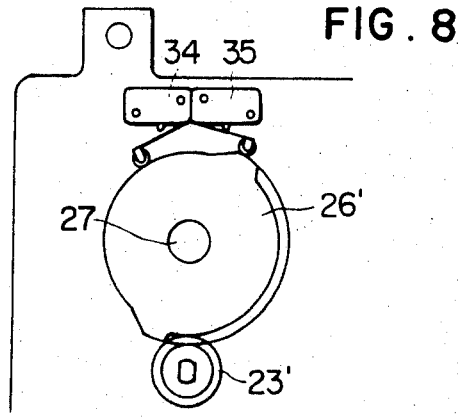
FIG. 8 is a view similar to that of FIG. 5 showing a modification of the control means of FIG. 5.

In the embodiment of FIG. 8, there is provided a segmental gear 26' and a pinion gear 23' substituted for the gear 26 and arm 23 respectively. The same operation may be performed by the modification as that of the embodiment of FIG. 5.

Figure 9:
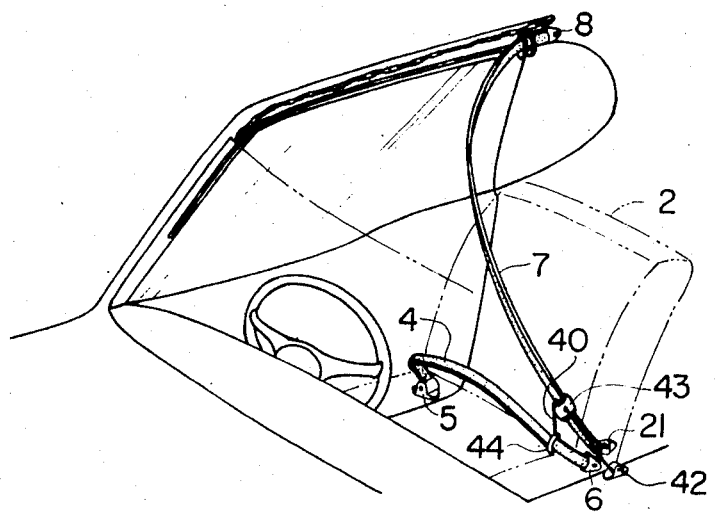
FIGS. 9 to 12 are perspective views of different embodiments respectively of seat belt devices constructed in accordance with the subject invention, the vehicle door being shown in closed position.

In FIG. 9, the string member of the embodiment is at its one end directly fastened to the ring 44 freely slidable on the belt 4 while its the other end is fastened to the retracter 42 through the member 43 fast on the belt 7. The same result is obtained as the embodiment of FIG. 1.

Figure 10:
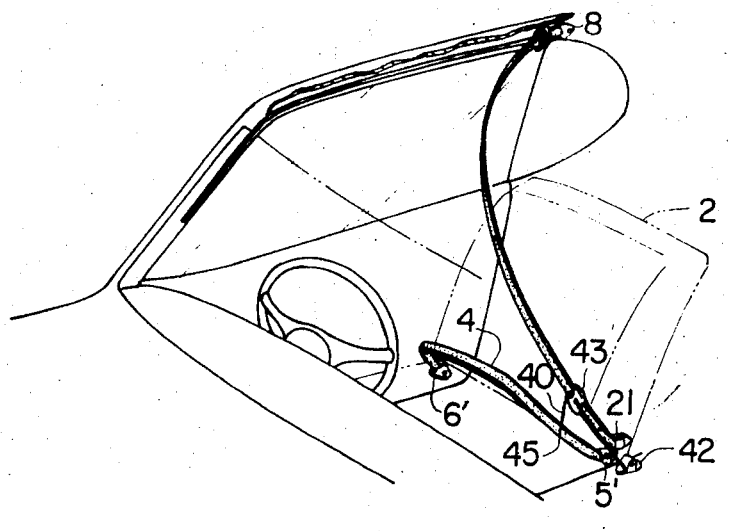

In FIG. 10, the waist belt 4 is fastened at its one end to the door by means of the same anchoring member 6' and at its the other end to the seat side by means of a retracter 5'. The string member 40 is fastened at its one end directly to the waist belt 4 as at 45 and at its the other end to a vehicle portion on the seat side by means of the retracter 42. The same result is obtained in operation as the embodiment of FIG. 1.

Figure 11:
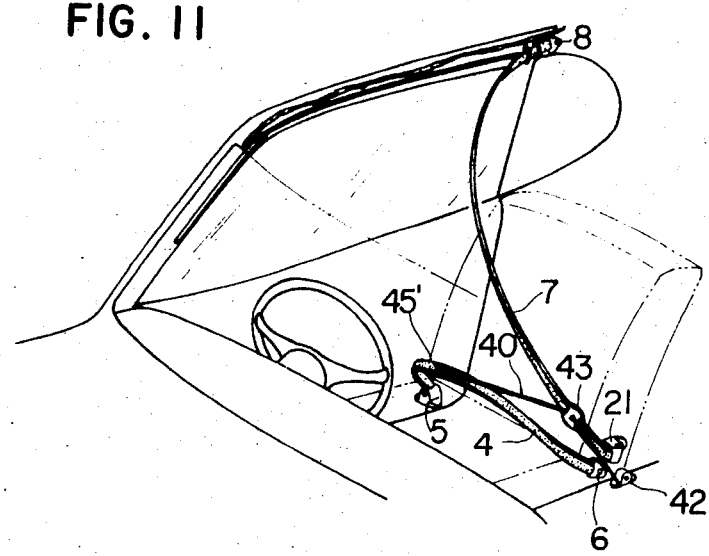

In FIG. 11, still further is shown a different embodiment which is characterized in that the waist belt 4 is fastened at its one end to the door by means of the retractor 5 and at the other end to a portion of the vehicle on the seat side by means of the anchoring member 6, and one end of the string member 40 is fastened to the waist belt 4 as at 45' closer to the door than the embodiment of FIG. 10. The same result is obtained in operation as the embodiment of FIG. 1.

Figure 12:
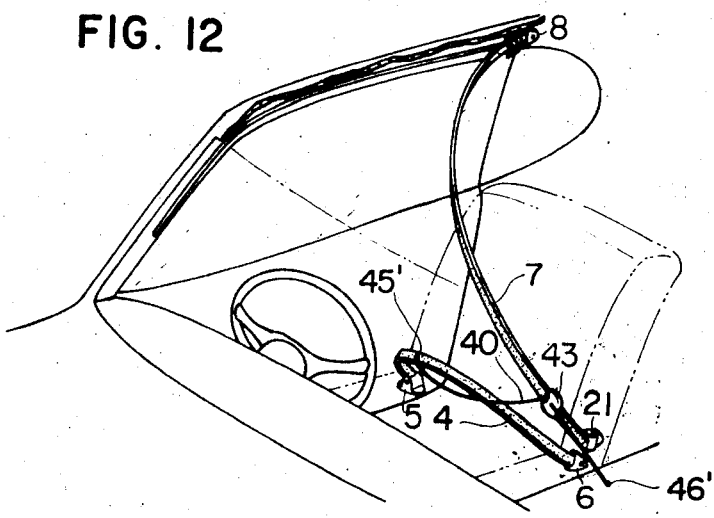

In FIG. 12, there is shown yet another embodiment different from the embodiment of FIG. 11 in that the string member 40 is fastened to a portion of the vehicle on the seat side directly as at 46' without utility of the retracter. The same result is obtained in operation as the embodiment of FIG. 1.

What is claimed is:

1. A seat belt device in a vehicle containing at least one door, a seat, and floor, roof and pillar vehicle elements, said device being for securing a passenger to said vehicle seat in the absence of manual manipulation, said device comprising; a waist belt permanently anchored at one end thereof to the vehicle door and at the other end to a portion of the vehicle opposed to said door on the seat or the floor; retracting means fastened to one of said belt ends for securing said waist belt to said door or vehicle portion; a shoulder belt having one end permanently anchored to a roof side portion of the vehicle body immediately over the shoulder of a passenger in said seat; a second retracting means securing the other end of said shoulder belt to a portion of the vehicle opposite to said door on the seat side or the floor; a string member linking said waist and shoulder belts so as to form a preset space between said belts in a passenger protecting position while permitting said space to vary upon displacement of both said belts; a guide track extending closely along a curvature of the roof side from a portion thereof proximate the end of said shoulder belt over the passenger's shoulder toward the lowermost end of a front pillar of the vehicle; sliding guide means adapted to freely slide within said track and engage said shoulder belt in freely slidable relation therewith; driving means; a cable connecting said driving means to said sliding means; and means for controlling said driving means in response to ingress or egress motion of the passenger so as to respectively displace said shoulder belt and said waist belt into the protecting or unprotecting position rendering it unnecessary for the passenger to manually strap to or release his body from the vehicle seat.

2. A seat belt device as claimed in claim 1, said driving means including a winding drum, said cable extending about said drum and being attached to said sliding guide means so as to move said sliding guide means to and fro along said track in response to winding and unwinding of said cable on said drum.

3. A seat belt device as claimed in claim 1, said sliding means comprising a pair of guide members, a first one of said guide members being more close to said front pillar then the other being fastened to said cable, the second guide member being freely slidable on said cable so that forward movement of said cable causes said slidable second guide member to follow said first member in spaced relation therewith.

4. A seat belt device as claimed in claim 1; comprising retractor means anchoring said string member at both ends thereof to a portion of the vehicle floor, intermediate portions of said waist and shoulder belts slidably engaging said string member so as to provide a preset space between both said belts in a passenger protecting position while permitting said space to vary in response to displacement of the belts.

5. A seat belt device as claimed in claim 1; comprising retracting means anchoring said string member at one end thereof to a portion of the vehicle floor and at the other end to said waist belt, the intermediate portion of said string member being slidably engaged with said shoulder belt.

6. A seat belt device as claimed in claim 1, said string member being anchored at one end thereof to a portion of the vehicle floor or seat side and the other end thereof to said waist belt, an intermediate portion of said string member being slidably engaged with said shoulder belt.

* * * * *